May 12, 1959     G. L. KITSON     2,886,001
ANNULAR POULTRY NEST

Filed March 28, 1955     2 Sheets-Sheet 1

INVENTOR.
Gerald L. Kitson
—BY—
Attorney

May 12, 1959 G. L. KITSON 2,886,001
ANNULAR POULTRY NEST
Filed March 28, 1955 2 Sheets-Sheet 2
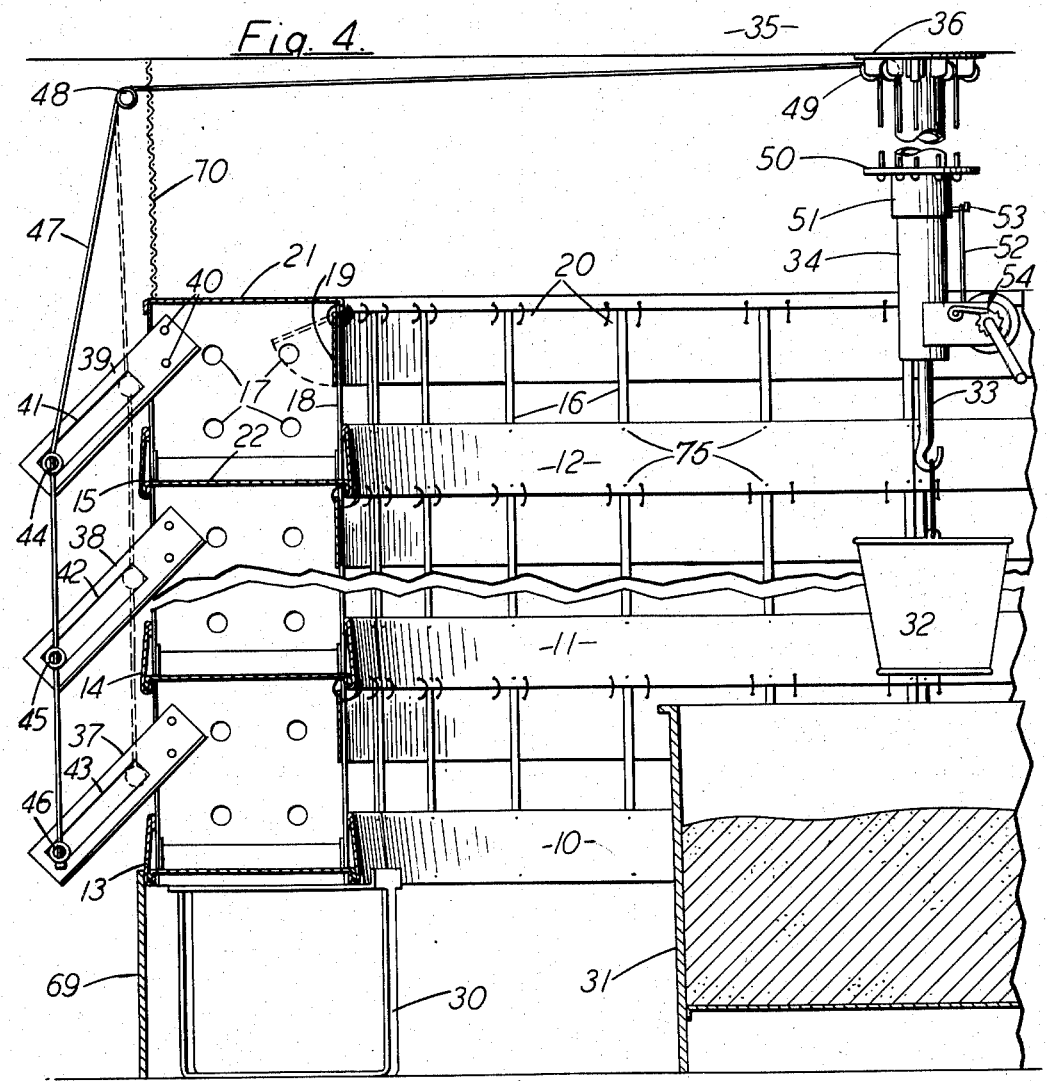
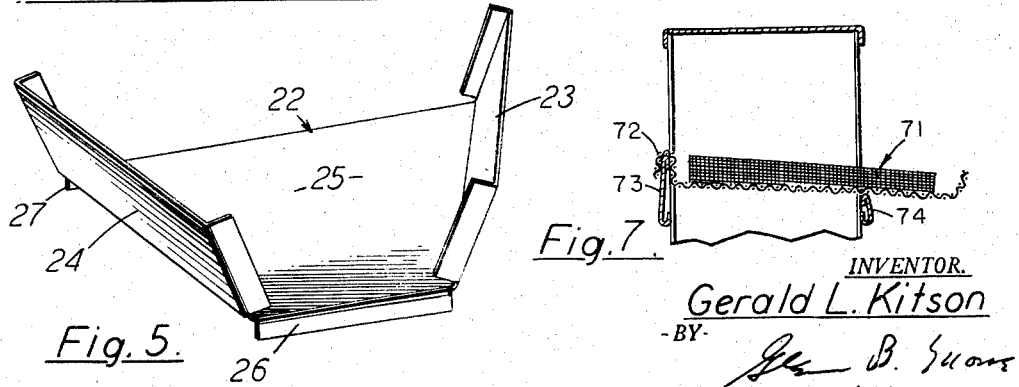
INVENTOR.
Gerald L. Kitson United States Patent Office 2,886,001
Patented May 12, 1959

2,886,001

ANNULAR POULTRY NEST

Gerald L. Kitson, Rockford, Mich.

Application March 28, 1955, Serial No. 497,316

3 Claims. (Cl. 119—45)

This invention relates to the construction of poultry nest equipment. Nest units provided by the invention form a series of compartments in which the birds lay eggs. Each of the compartments of any form of this type of equipment must not only be easily accessible to the bird, but also must be constructed in such a way that the eggs may be conveniently removed and attention given to the maintenance and the cleaning of the nest area. The primary purpose of this invention is to provide an annular nesting structure which will be readily utilized by the birds, and yet will minimize the amount of labor involved in gathering the eggs and maintaining the nest. These objectives are realized by this invention while maintaining sufficient simplicity of construction to permit shipment of the nest units in the knock-down condition, and even with the annular structure broken down into components of essentially flat sheet members. The saving in labor resulting from the use of this invention not only follows from the shortened path of travel required for an attendant to move opposite a given number of nests, but also results from the positioning of litter and egg-storage containers substantially on the axis of the annular nest unit. With this arrangement, the attendant may walk around the inner working area of the nest unit facing in a generally tangential direction, resulting in his having one hand conveniently positioned for working with the nests, and the other immediately adjacent the egg storage and litter containers. Provision is also made by this invention for manipulating a variable-position perching bar between an extended position where it is properly located for use as a perch, and a retracted position in which the bar functions to obstruct the entrance of the birds to the nests. The position of the bar is controlled preferably through the use of halliards, and the obstructing position of the bars is ordinarily used at night to keep the birds out of the nests.

The several features of this invention will be discussed in detail through analysis of the particular embodiments illustrated in the accompanying drawings. In the drawings:

Figures 1 and 2 indicate schematic layout diagrams showing typical installations of the annular nest units described hereinafter.

Figure 3 presents a plan view of a structure embodying this invention.

Figure 4 is a section taken on the plane 4—4 of Figure 3.

Figure 5 is a perspective view on an enlarged scale of a compartment floor member incorporated in the structure shown on Figures 3 and 4.

Figure 7 is a cross section taken on a vertical radial plane of the device showing a modified form of mesh floor.

Figure 3:
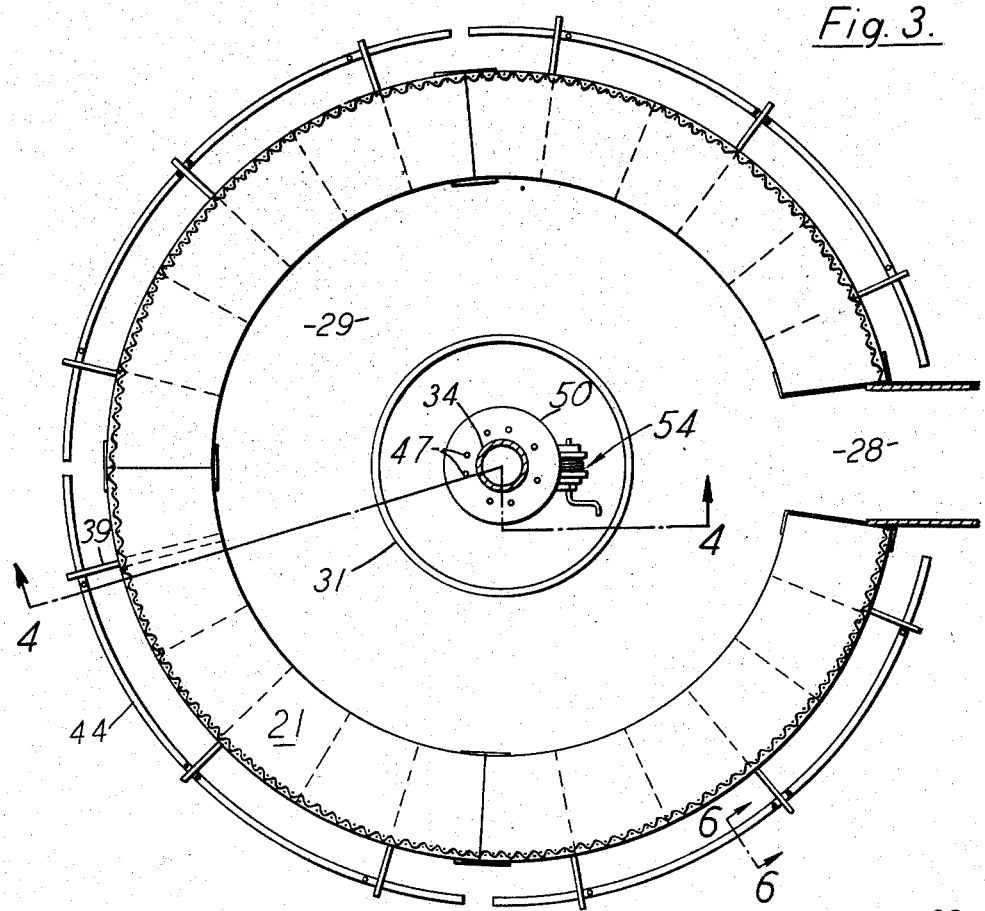

Referring particularly to Figures 3 and 4, three superimposed annular groups of compartments are provided by a structure formed of sheet metal components which include the inner wall panels 10, 11, and 12, and the outer panels 13, 14, and 15 concentric with the inner panels and spaced therefrom by a series of radially-extending panels as indicated at 16. These latter panels are preferably provided with ventilation holes as indicated at 17 opposite each of the compartments. Each of the vertical radial panels 16 is provided with a flange as indicated at 18, and each of the compartments has a door 19 extending substantially the full width of the compartment and disposed inwardly with respect to the compartment from the flange 18, resulting in the door being capable of moving inwardly (when urged by the hand of the attendant), but not outwardly by the bird within the compartment. The access door panels 19 are preferably hinged to the nest structure by the rings 20. A covering panel 21 is positioned on top of the uppermost bank of compartments, and each of the compartments is fitted with a floor member 22 formed as best indicated in Figure 5. The upper edges of the sidewalls 23 and 24 of the floor member fit between the vertical panels 16, with the actual floor 25 being of somewhat less width than the spacing between the panels 16 (resulting from the flaring relationship of the sidewalls 23 and 24). The floor members 22 are positioned within the structure through the engagement of the downturned flanges 26 and 27 within trough-shaped sections at the lower edges of the annular panels 10 to 15 inclusive.

It is preferable that the annular unit be assemblable in sections for flexibility of installation, and that in any event the annular configuration be interrupted as indicated at 28 in Figure 3 to form a walk-way leading into the interior work area 29. Leg units as indicated at 30 in Figure 4 are provided to give a desired position of a nest unit above the ground for convenience in maintenance of the nests.

It is preferable that the litter container 31 be positioned within the work area 29, and substantially coaxially with the annular configuration of the nest structure. An egg-collection pail 32 is suspended from an overhead position on the hook 33 secured to the column 34, which, in turn, is preferably bolted to a roof beam 35 at the mounting plate 36. The suspended condition of the egg container 32 establishes a pendulum action which gives the maximum saving of space within the work area 29. No structure is provided underneath the egg container 32 for its support, and the litter container is therefore unobstructed. In addition, the pendulum suspension of the egg container makes it possible to obtain extra clearance by the lateral displacement of the egg container when increased amount of access to the litter container is necessary.

Figure 6:
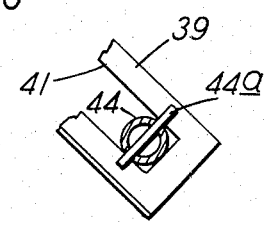
Figure 6 is a section on an enlarged scale taken on the plane 6—6 of Figure 3.

At the outer perimeter of the nest structure, an annular series of brackets are indicated respectively at 37, 38, and 39. These are secured to the vertical radial panels 16 by fastenings as indicated at 40 in Figure 4, and the brackets provide slots 41, 42, and 43 which extend downward and outwardly from a point opposite the entrance to the several compartments. Arcuate bars as indicated at 44, 45, and 46 in Figure 4 are slideably received within the slots 41, 42, and 43, and are positioned through the use of halliards as shown at 47. These halliards pass around guiding pulleys 48 and 49, and terminate in a ring 50 mounted on a sleeve 51 slideably engaging the column 34. A cable 52 extends from a hook 53 on the sleeve 51 to a winch generally indicated at 54. Operation of the winch induces axial sliding motion of the sleeve 51 and the ring 50, and operates the halliards 47 to move the bars from the extended perching position shown in full lines in Figure 4 upwardly and inwardly to the opposite extremity of the slots where they function to obstruct the entrance of the compartments. Arcuate bars 44, 45, and 46, preferably extend over a sector of substantially less than 90° in order to permit their inward and outward movements without interference. In most cases, it is advisable to provide transverse pins as indicated at 44a in Figure 6 to prevent accidental peripheral withdrawal of the bars from their respective supporting brackets.

Figure 2:
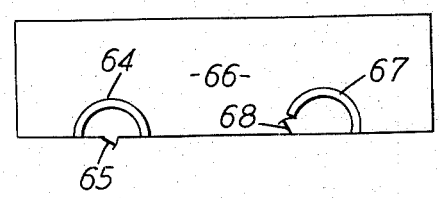
Figure 1:
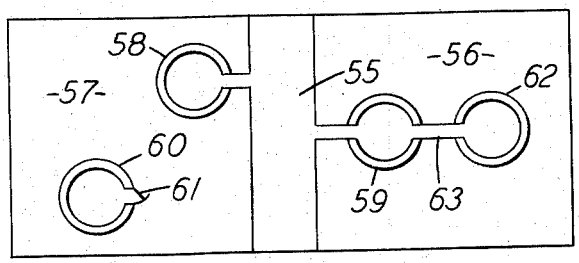

Referring to Figures 1 and 2, the unit described in detail in Figures 3 through 6 may be installed in a variety of arrangements. Figure 1 presents a schematic diagram of a poultry house having a central corridor 55, and the poultry areas indicated at 56 and 57. Nesting units 58 and 59 are shown installed with a short walk-way communicating with the central corridor 55. The unit 60 is shown in a position isolated from the corridor, and with a swinging door 61 which would be closed to exclude birds from the central working area of the nest unit. The unit 62 is shown with a short section of walk-way 63 communicating with the nest unit 59, and through it with the corridor 55. Figure 2 illustrates other arrangements for installing the nest units, with the nest unit 64 being formed of an annular segmental structure of approximately 180° in extent. A door 65 into the wall structure forming the nesting area 66 permits access to the inner working area of the nesting unit. The nest structure 67 is substantially less than 180° in extent to permit the swinging door 68 to open directly into the floor area 66. Preferably, a skirt panel 69 (refer to Figure 4) prevents movement of the birds underneath the nest unit; but if increased floor space is desirable, this panel may either be omitted or positioned opposite the inner surface of the annular structure. A screen 70 is also preferable around the periphery and extending above the nest sufficiently near to the roof area to prevent entrance of the birds into the interior of the nest from that direction.

Referring to Figure 7, a modified form of the invention utilizes a wire mesh floor unit 71 in the shape of a tray. The outer end of the floor unit has a hooked portion 72 which engages the top of the annular panel 73 (similar to the panels 13, 14, and 15 of Figure 4), and the inner portion of the floor unit rests on the inner annular panel 74. Preferably, the floor unit extends about five inches toward the center of the work area 29 from the inner panel 74, and tapers in width from approximately eleven inches wide (at the end adjacent the hook 72) to six inches wide at the projecting end. The slope of the floor should be about one inch to the foot downwardly toward the center to establish "roll-away" characteristics which will bring the eggs to a point within easy reach of a person standing in the work area 29, and will permit him to tell at a glance the location of the eggs without inspecting each compartment. For best results, the wire mesh of which the slanted floor units are made should be coated with a soft material such as any of the well-known plastic compositions. The mesh of about one-half inch spacing has been found satisfactory, and the use of the "roll-away" system eliminates the need for the litter container 31.

The annular sheet metal panels 10, 11, 12, 13, 14, and 15 are preferably initially flat pieces prior to being assembled to form the illustrated unit. These members and the flanges 18 of the radially-extending panels 16 have aligned apertures for receiving fastenings as indicated at 75 in Figure 4.

The particular embodiments of the present invention which have been illustrated and discussed herein are for illustrative purposes only, and are not to be considered as a limitation upon the scope of the appended claims. In these claims, it is my intent to claim the entire invention disclosed herein, except as I am limited by the prior art.

I claim:
1. A poultry nest, comprising: a group of initially substantially flat members, certain of said members being deformable, said members being components of an annular structure having radially spaced and substantially concentrically-disposed wall portions and radially-extending partitions, said components having aligned apertures with respect to each other, and said structure including fastening means engaging said apertures, and also including vertically-spaced floor members, said structure defining a central work space and a plurality of nesting compartments each with an entrance opening on the outside and an access opening on the inner surface thereof, said access-opening having a closure that opens exclusively toward the interior of its respective compartment, said structure further having an interruption in its annular continuity to form a walkway; and perch means including a group of annularly arranged brackets each providing a downwardly and outwardly-inclined slot from a position adjacent certain of said entrance openings, said perch means also including a plurality of annularly-shaped bars each slideably received in said slots and extending over a sector of substantially less than 180 degrees, and halliard means for elevating said bars from the extended position in said slots corresponding to perching position, to an elevated inward position wherein said bars obstruct the entrance to said compartments.

2. A poultry nest, comprising: an annular structure, said structure defining a plurality of nesting compartments each with an entrance opening on the outside, and perch means including a group of annularly arranged brackets each providing a downwardly and outwardly-inclined slot from a position adjacent certain of said entrance openings, said perch means also including a plurality of arc-shaped bars each slideably received in said slots and extending over a sector of substantially less than 180 degrees, and halliard means for elevating said bars from the extended position in said slots corresponding to perching position, to an elevated inward position wherein said bars obstruct the entrance to said compartments.

3. A poultry nest, comprising: a structure defining a plurality of nesting compartments each with an entrance opening; and perch means including a group of brackets each providing a downwardly and outwardly-inclined slot from a position adjacent certain of said entrance openings, said perch means also including a plurality of bars each slideably received in said slots, and halliard means for elevating said bars from the extended position in said slots corresponding to perching position, to an elevated inward position wherein said bars obstruct the entrance to said compartments.

References Cited in the file of this patent

UNITED STATES PATENTS

| | | |
|---|---|---|
| 1,921,352 | Ferguson | Aug. 8, 1933 |
| 2,041,049 | Crawford | May 19, 1936 |
| 2,191,651 | Haesloop | Feb. 27, 1940 |
| 2,512,861 | Hill | June 27, 1950 |
| 2,640,461 | Dadlow | June 2, 1953 |
| 2,698,599 | Kalmoe | Jan. 4, 1955 |

FOREIGN PATENTS

| | | |
|---|---|---|
| 518,820 | Germany | Feb. 23, 1931 |

OTHER REFERENCES

"The Waterbury Sanitary Fountain Attachment," Sept. 1912, 2 pages.